United States Patent [19]

Anderson

[11] Patent Number: 4,494,920

[45] Date of Patent: Jan. 22, 1985

[54] POSITIVE-DISPLACEMENT VOLUMETRIC DEPOSITOR APPARATUS FOR BAKING DOUGH AND THE LIKE

[75] Inventor: Joseph R. Anderson, Ada, Mich.

[73] Assignee: Werner Lehara, Inc., Grand Rapids, Mich.

[21] Appl. No.: 549,071

[22] Filed: Nov. 7, 1983

[51] Int. Cl.³ .............................. A21C 3/10; A21C 5/00
[52] U.S. Cl. .................................... 425/190; 425/239; 425/308; 425/310
[58] Field of Search ............... 425/238, 239, 240, 241, 425/289, 308, 182, 190

[56] References Cited

U.S. PATENT DOCUMENTS

| | | | |
|---|---|---|---|
| 1,651,242 | 11/1927 | Baker | 425/182 |
| 1,900,607 | 3/1933 | Kremmling | 425/308 |
| 2,787,972 | 4/1957 | Vogt | 425/239 |
| 2,815,573 | 12/1957 | Trelease | 425/362 |
| 4,212,609 | 7/1980 | Fay | 425/182 |

FOREIGN PATENT DOCUMENTS

| | | | |
|---|---|---|---|
| 856029 | 12/1960 | United Kingdom . | |
| 759075 | 9/1980 | U.S.S.R. | 425/239 |

Primary Examiner—Willard E. Hoag
Attorney, Agent, or Firm—Price, Heneveld, Huizenga & Cooper

[57] ABSTRACT

A volumetric metering apparatus which provides a continuous succession of accurately metered deposits of baking dough or other flowable media. Media is fed into a cavity in the apparatus. The cavity is in fluid communication with an outlet. A valve is disposed in the cavity so as to define first and second chambers therein. The valve is movable between a first position where the first chamber is in fluid communication with the outlet and a second position where the second chamber is in fluid communication with the outlet. A piston device disposed in the cavity and operatively associated with the valve alternatingly discharges media from each chamber when the chamber is in communication with the discharge orifice.

38 Claims, 21 Drawing Figures

POSITIVE-DISPLACEMENT VOLUMETRIC DEPOSITOR APPARATUS FOR BAKING DOUGH AND THE LIKE

BACKGROUND OF THE INVENTION

This invention relates to continuously-repetitive quantity-metering devices, used for example in manufacturing and processing operations to repeatedly dispense precisely metered quantities of a media. The metering apparatus of the present invention can be used with a great many different particular types of media, but in a particularly desirable application the invention may be used for highly accurate positive-displacement volumetric metering of flowable baking dough or other food products in conjunction with elements of a "wire-cut machine". The wire-cut machine in its basic form is a machine which has for many years been a well-known apparatus in the baking trade.

Conventionally, the standard wire-cut dough metering machine uses counter-rotating feed rollers within a hopper, which force a continuous supply of baking dough downward through shaping orifices, with a cutting wire or knife being passed beneath each orifice at repeated time intervals, thereby slicing off a short cylindrical (or otherwise shaped) segment of the baking dough on each process cycle, representing an individual cookie or the like.

Conventional wire-cut dough metering machines have long been used in the baking trade, and to some extent in related fields, because such machines could produce food product deposits of fairly reasonably consistent sizes and weights. In the past, these machines were acceptable even though they provided what is now only a marginal degree of repetitive uniformity. In the past, this lack of repetitive uniformity could be compensated simply by operating the machine to produce larger deposits than required on the average. Thus, the probability of a particular deposit being underweight was reduced.

However, it is becoming increasingly necessary to provide much more accurate, repeatable metering dispensing devices by which each individual deposit weighs substantially the same as the other like deposits, in order to produce food more economically. It is not economically feasible simply to increase average product weight because of the increased costs of ingredients.

Therefore, there has been for some time a need for increasingly accurate, highly repeatable food volume depositors. The demand is not restricted necessarily to food depositors, but includes machines for other physically analogous media as well. There have been a number of fairly accurate volumetric depositor devices which employ a cylindrical rotating head with at least one piston passage therethrough. Each piston passage is oriented radially outwardly from the cylindrical head. The head rotates in a horizontally disposed cylindrical cavity. Media is fed into the top of the cavity. Metered quantities are ejected from the bottom of the cavity. Pistons reciprocate in the piston passageways so that media is sucked into the piston passageway when the passageway is in communication with the top of the cavity. The pistons eject media from the piston passageway when the piston passageways are in communication with the bottom of the cavity. For example, in U.S. Pat. No.2,815,573 to Trelease, entitled MANUFACTURE OF CHEESE SLICES, discloses a cheese slice-dispensing apparatus employing a rotary head having a plurality of molds and ejectors thereon for receiving charges of molten cheese and ejecting slices of cooled cheese.

Another example is shown in U.S. Pat. No. 4,212,609 to Fay, entitled METHOD AND APPARATUS FOR PRODUCING SHAPED AND SIZED FOOD ARTICLES. Fay employs a depositor roll having a plurality of ejectors thereon which alternately receive and eject discrete quantities of food. The rotary depositor roll is disposed beneath a pair of counter-rotating feed rolls which feed the media from a supply hopper. Vogt, U.S. Pat. No. 2,787,972 entitled APPARATUS FOR PRODUCING PLASTIC MASSES and U.K. Patent Specification No. 856,029 entitled METHOD AND APPARATUS FOR DIVIDING PLASTIC SUBSTANCES BY VOLUME disclose a similar food depositor wherein the cylindrical head has only one piston passage which extends completely through the head with two pistons therein. Because just two pistons are used, the design is believed to be particularly susceptible to extreme vibrations when high deposition rates are selected. The weight of the pistons will be shifted toward one side of the cylindrical head at two points during one rotation of the head.

One problem with such volumetric depositors is that dough or media often works its way past the pistons in the piston passageways clogging the actuating mechanisms which impart movement to the pistons in the piston passageways. This impairs the movement of the pistons in the passageways and makes the machine very difficult to clean. Furthermore, in food production, sanitation could be in jeopardy by the accumulation of food behind the pistons if the machine is not cleaned often enough.

Another problem with such depositors is that because each piston is at the bottom of its stroke when the piston is at the top of the cylindrical cavity, and at the top of its stroke when at the bottom of the cavity, the cylindrical head is always unbalanced about its axis of rotation. Thus, such depositors can shake violently if run at high deposition rates. Such shaking can cause mechanical failure of some parts, and is noisy.

In narrower aspects of this invention, a new method of food manufacture can be provided. Repetitive, accurately-metered, volumetric quantities of media ejected can be injected as pulses into a different ejection stream emanating from conventional extruder or like apparatus, to thereby obtain, in effect, wholly-encapsulated or embedded nugget-like deposits of one media within another, which may be wire-cut or otherwise separated between the embedded deposits to form separate, discrete blocks (i.e., units) of one media within another, as for example a filling material within an outer covering material.

SUMMARY OF THE INVENTION

The present invention provides a positive-displacement media feeder depositor apparatus which produces highly consistent and continuously repetitive volumetrically metered media deposits. The metering and depositing apparatus of the invention is also easy to disassemble and clean because it is comprised of relatively few operating parts and those exposed to the food are contained within a module which can be removed from the machine and replaced simply by loosening four bolts and removing the module as a unit. Therefore, "down time" associated with the cleaning of the machine can be substantially reduced as can the amount of time required to disassemble and clean the removed module. Furthermore, the media depositor of the present invention can be operated very smoothly at high deposition rates.

Briefly stated, the volumetric metering apparatus of the present invention comprises a supply means for providing a continuous source of pressurized media at a supply outlet, a head having a cavity therein which is in fluid communication with the supply outlet, a valve disposed in the cavity to define two cooperative chambers therewithin, and a reciprocally-movable positive-displacement metering plunger means disposed in the cooperative chambers for alternatingly discharging volumetric quantities of media from each chamber. Means are also provided for reciprocally moving the valve between two positions. When in the first position the first chamber is in fluid communication with the supply means, whereupon the first chamber is charged with media and the second chamber is in fluid communication with the orifice through which media is forced by the plunger means. When the valve is in the second position the second chamber is in fluid communication with the pressurized supply means, whereupon the second chamber is charged with media and the first chamber is in fluid communication with the orifice through which media is forced by the plunger means.

Further concepts and structural features of the present invention will become more apparent following consideration of the ensuing detailed specification in light of the appended drawings, which together set forth preferred embodiments as illustrations of the invention.

DESCRIPTION OF THE PREFERRED EMBODIMENT

Figure 1:
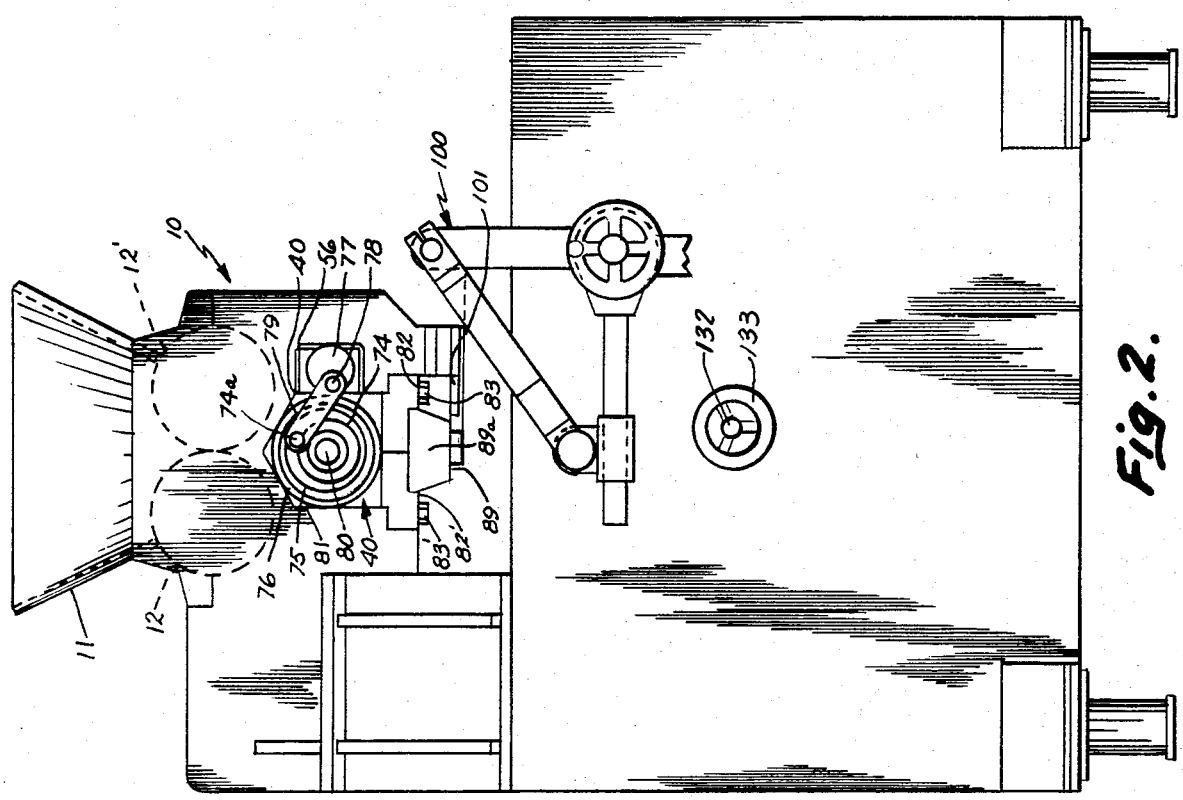
FIG. 1 is a front elevation of the volumetric quantity-metering deposit or apparatus of the present invention.

As shown in FIG. 1, the positive-displacement volumetric metering depositor apparatus of the present invention includes a hopper 11 for holding and supplying a quantity of media such as baking dough or the like, beneath which are two counter-rotating feed rolls 12, 12' which rotate toward one another and force a continuing stream of media into the machine. Beneath the feed rolls is the positive-displacement module assembly 40 (FIG. 5), which contains a valve and piston to be explained in greater detail below, the valve and piston receiving the dough from feed rolls 12, 12' and discharging the dough in precise volumetric quantities through an orifice 89 in a die cup 89a, whereupon a wire-cut assembly 100 cuts the dough 90 projecting through orifice 89 into precise slices of food product which drop onto a conveyor belt (not shown) below the orifice.

A positive-displacement operator assembly 30 (FIGS. 1 and 3), having an outer valve crank throw 31 and an outer piston crank 32, is included for actuating the valve and piston of module 40, in a manner to be described in detail below. The outer valve crank throw 31 is actuated by a valve crank arm 15 which is in turn actuated by a valve crank arm cam 16 fixedly secured to and rotatable with a drive shaft 18. Drive shaft 18 is operably connected to a drive motor (not shown) and should be understood to turn a clockwise direction when viewed in FIG. 1. The outer piston crank 32 is actuated by a piston crank arm 19 which includes an upper crank arm 20 connected to a lower crank arm 21 by a slotted linkage 22. The stroke of the piston crank arm can be adjusted by a stroke-adjustment mechanism 23, to be described in greater detail below.

Figure 5:
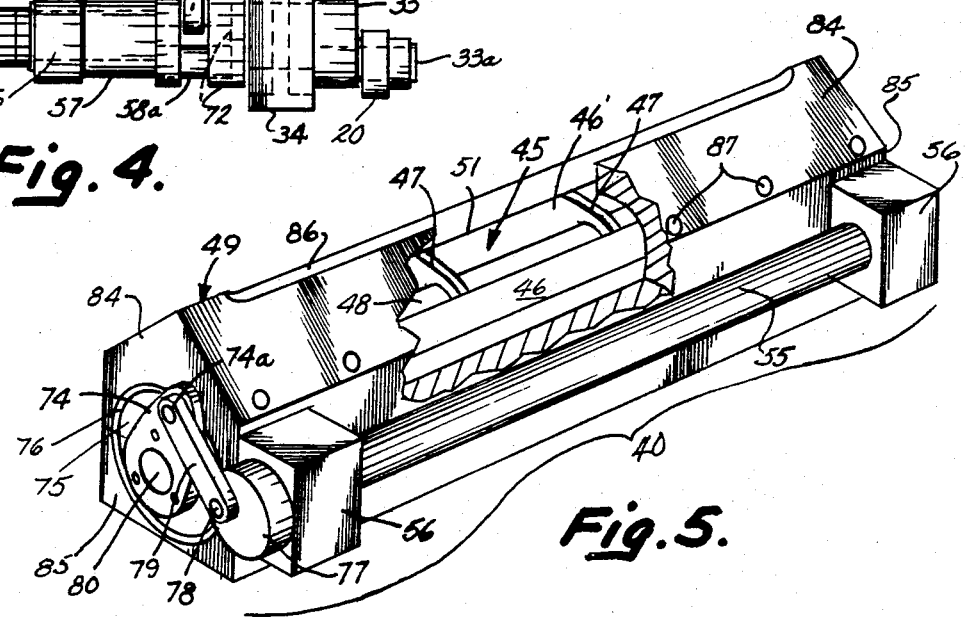
FIG. 5 is a partially broken perspective view of the positive-displacement module assembly.
Figure 10:
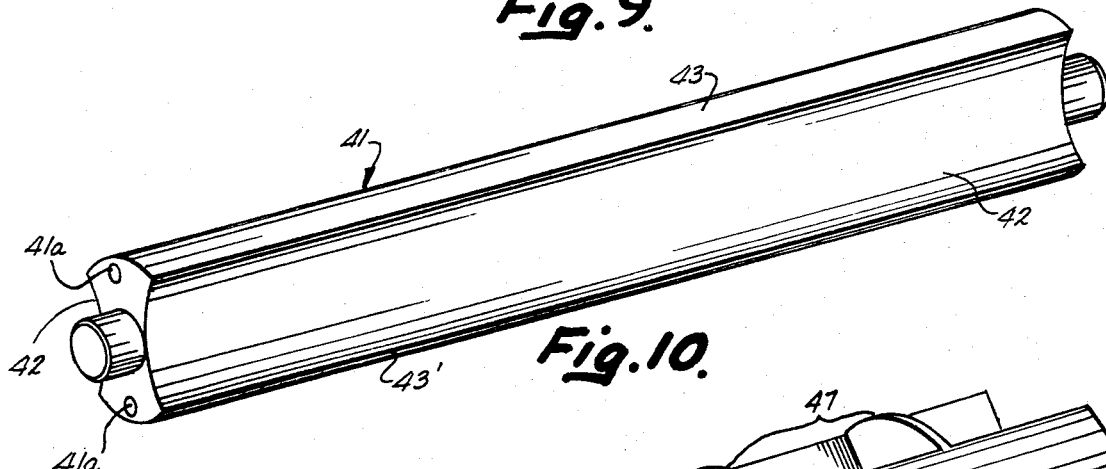
FIG. 10 is a perspective view of the valve used in the apparatus.
Figure 11:
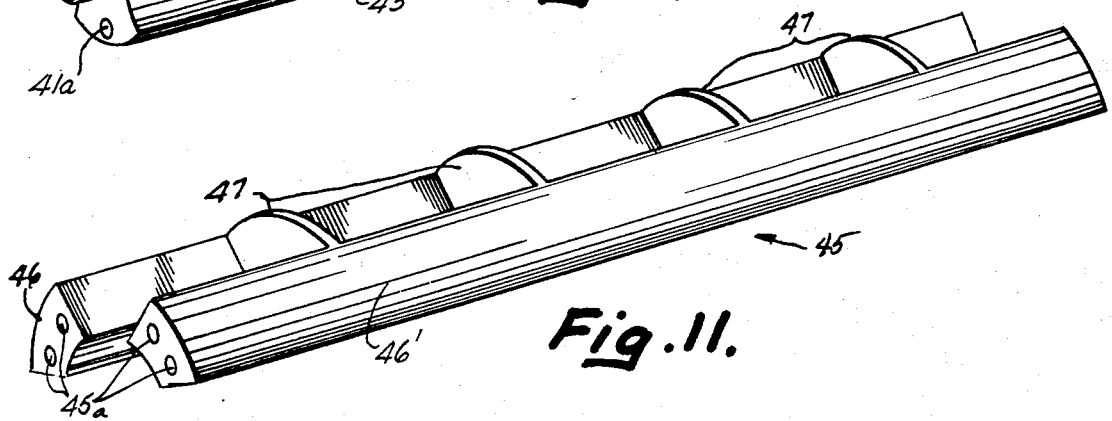
FIG. 11 is a perspective view of the positive-displacement vane or piston.
Figure 13:
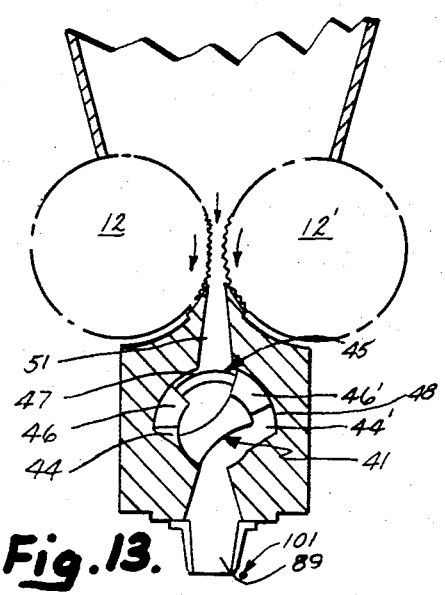
FIGS. 13–20, inclusive, are structural schematic drawings showing the valve and positive-displacement vanes or piston, in conjunction with the associated actuating components at different points during a metering cycle.

The primary operative components of the metering apparatus 10 are a valve 41 shown separately in detail in FIG. 10, and piston mechanism 45, shown separately in FIG. 11, which fit together and are so disposed in a cavity 48 located in head 49 of positive-displacement modular assembly 40, shown in FIG. 5. The general nature and functioning of metering apparatus 10 can best be understood with reference to its operation, which is schematically shown in FIGS. 13 through 20 inclusive. As shown in FIG. 13, feed rolls 12, 12' force media under pressure into cavity 48. Valve 41 divides cavity 48 into two longitudinally elongated chambers 44, 44'. Piston mechanism 45 is disposed in an upper portion 50 of cavity 48 and is comprised of two elongated pistons 46, 46' of arcuate cross section which are connected by a plurality of spaced divider plates 47 thereby forming an open arcuate grid.

Figure 14:
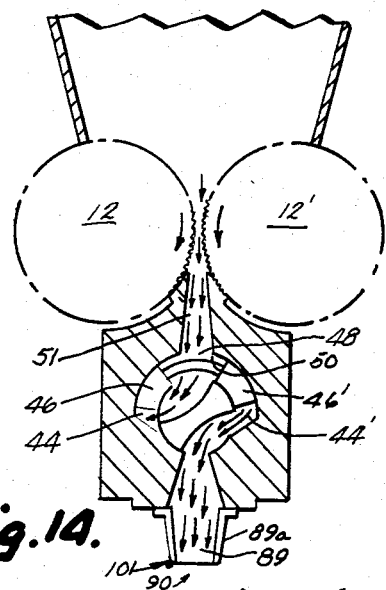
Figure 15:
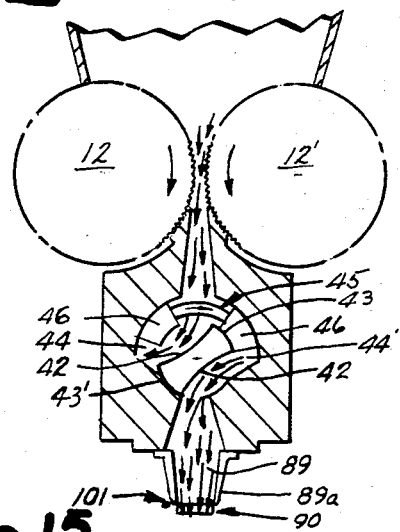

The relative position of the valve and piston mechanism after a cycle is completed is shown in FIG. 13. As shown in FIG. 14, feeder rolls 12, 12' apply a pressurized stream of flowable media into a throat 51, which is in fluid communication with the elongated arcuate cavity 48 therebelow. At this point, valve 41 is positioned such that left-hand chamber 44 is being charged with media. Right-hand chamber 44' is already filled with media from the previous cycle and is in fluid communication with discharge orifice 89 of die cup 89a. The charging of chamber 44 continues as shown in FIG. 15, while piston 46 is moved increasingly further into chamber 44'. As this occurs, media is extruded out of chamber 44' through discharge orifice 89 since chamber 44' is in fluid communication therewith. Once the piston mechanism 45 has completed its stroke toward chamber 44' forcing piston 46 fully into chamber 44' (FIG. 16), the extrusion of media through orifice 89 from chamber 44' is completed. At this point, chamber 44 is completely charged, and a wire-cut wire 101 is rapidly moved through the extruded column of media and across orifice 89, as shown in FIGS. 17–18, causing a measured deposit 90 (FIG. 18) to be separated from the media stream.

Figure 16:
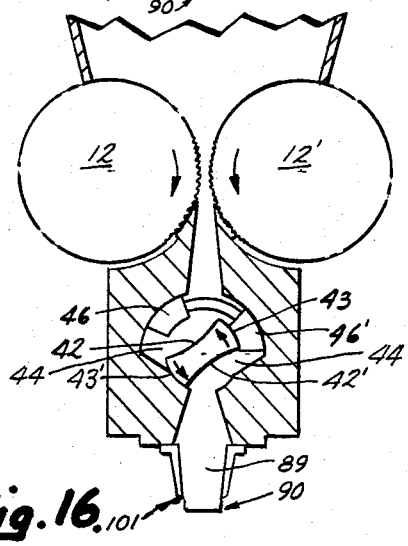
Figure 17:
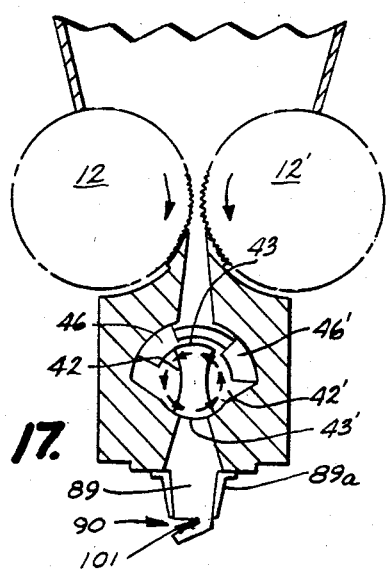
Figure 18:
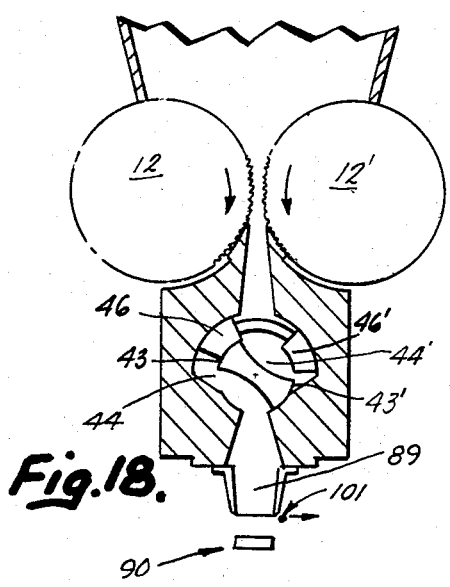

At the time the wire 101 moves across the opening of die cup 89a, valve 41 begins to pivot from the position where chamber 44' is in fluid communication with orifice 89, as shown in FIG. 16, to the position where chamber 44 is in fluid communication with orifice 89, as shown in FIG. 18. Metering apparatus 10 is then in position to commence extrusion of media from chamber 44.

Between the positions shown in FIGS. 16 and 18, the valve 41 prevents media from being forced by the feed rollers 12, 12' through orifice 89. As shown in FIG. 17, for instance, the lower convex surface 43' extends across the top, narrow part of orifice 89 preventing media from escaping therethrough. It should also be noted that the upper and lower convex surfaces 43, 43' are sufficiently wide such that the upper convex surface 43 will be in contact with one or the other of pistons 46 or 46' while the lower convex surface 43' is in contact with one or the other side of the lower arcuate surface of cavity 44' on either side of the top of orifice 89.

Figure 19:
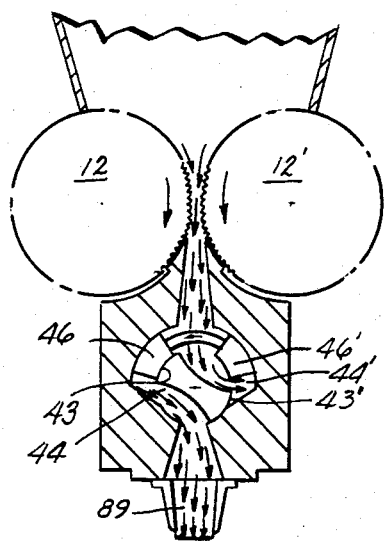
Figure 20:
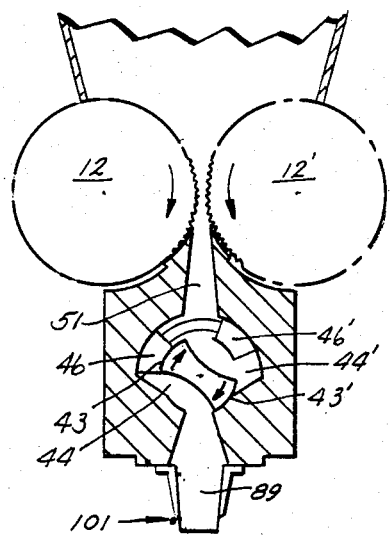

From the position shown in FIG. 19, piston mechanism 45 pivots in a counterclockwise direction, thereby forcing piston 46 into chamber 44 and forcing media out of the latter through discharge orifice 89. As shown in FIG. 20, wire 101 of wire-cut assembly 100 (generally shown in FIG. 1) then moves into position to cut a deposit 90 from the end of die cup 89a. Once the deposit is cut, one complete cycle is finished and the components are in the position as shown in FIG. 14. At the same time the second deposit 90 is being cut by wire 101, valve 41 pivots from the position shown in FIG. 20 to the position shown in FIG. 13; one cycle is completed and the apparatus is ready for the next.

As can be seen from FIGS. 13 through 20, valve 41 moves from one position, where chamber 44' is in fluid communication with orifice 89 and where cavity 44 is in fluid communication with the pressurized supply of food media, to a second position, where chamber 44 is in fluid communication with orifice 89 and chamber 44' is in fluid communication with the pressurized supply source, merely as a result of pivotally reciprocating valve motion of approximately 90° about its longitudinal axis.

Piston mechanism 45 also pivotally reciprocates in the upper arcuate portion 50 of cavity 48, during which motion piston 46' first moves into chamber 44' to force media therefrom, whereupon piston 46 is in position to begin its stroke into chamber 44' to force media from it, after valve 41 has pivotally reciprocated to establish fluid communication between chamber 44 and orifice 89. In FIG. 14 the piston 45 is shown rotated counterclockwise to the maximum extent and in FIG. 17 piston is shown rotated clockwise to the limit.

Before describing the details of the means by which the reciprocating motion of the valve and piston mechanism are imparted thereto, various features of the valve and piston mechanism should be explained. As shown in FIGS. 10 and 17, valve 41 has a pair of oppositely-disposed concave side surfaces 42 and a pair of oppositely-disposed convex side surfaces 43 extending the length thereof. Convex surfaces 43 are provided so that valve 41 may sealingly engage the rounded bottom of cavity 48 and similarly engage the rounded bottoms of pistons 46, 46', so as to substantially prevent the pressurized media from by-passing the valve and piston mechanism during a cycle as described above and thereby adversely affecting the accuracy of the deposit weight and volume. Concave side surfaces 42 are provided to facilitate the free flow of media into and out of chambers 44, 44'. For instance, as shown in FIG. 14, as piston 46' moves into chamber 44', media is forced across one concave surface 42 of valve 41 and out orifice 89. Similarly, media is forced across the opposite concave surface to commence filling the space in chamber 44 just vacated by the clockwise motion of piston 46. If no concave surfaces were provided, the flow of media into chamber 44 and out of chamber 44' could be constricted and a compressive reaction could take place.

Piston mechanism 45 comprises two elongated pistons 46, 46', as shown in FIG. 11. The two pistons are connected by a plurality of divider plates 47 which insure pistons 46, 46' move synchronously and which permit media to flow between pistons 46, 46', due to the spaced nature of the divider plates 47.

Figure 6:
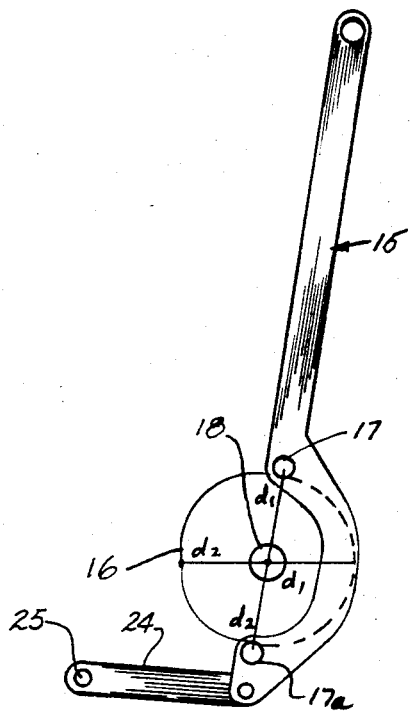
FIG. 6 is a front elevational view of valve crank arm assembly utilized in the apparatus.

Pivotal reciprocating motion is imparted to valve 41 by valve crank arm 15, shown in FIGS. 1 and 6. At its upper end, valve crank arm 15 is pivotally connected to outer valve crank throw 31, outer valve crank throw 31 being operably connected to valve 41 in a manner to be described. At its lower end, valve crank arm 15 is pivotally connected to a valve pivot arm 24 which is in turn pivotally connected to the front of the machine at 25. Valve pivot arm 24 thus permits valve crank arm 15 to move substantially vertically upwardly and downwardly but to restrict substantially its horizontal lateral movement.

Upward and downward movement of valve crank arm 15 is effected by a valve crank arm 16, which engages cam followers 17, 17a as shown in FIG. 6. Valve crank arm cam 16 is eccentrically mounted on a shaft 18 which is in turn operably connected to a motor (not shown) for rotation thereof. The distance between cam followers 17, 17a is equal to the length of any line drawn across cam 16 through the center of shaft 18, cam 16 being configured such that any line drawn through the center of shaft 18 terminating at two edges of the cam will be the same length as any other such line. Thus, cam followers 17, 17a will each continuously be in contact with cam 16 as cam 16 rotates. Since cam 16 is eccentrically mounted on shaft 18, it will first force valve crank arm 15 upwardly as shown in FIG. 1 against cam follower 17 and then downwardly against cam 17a. This upward and downward movement will be transmitted to outer valve crank throw 31 which as indicated above is operably connected to valve 41. The upward and downward movement of valve crank arm 15 is thereby transmitted as reciprocal rotational movement to outer valve crank throw 31, which motion is then transmitted to valve 41.

Outer valve crank throw 31 (FIGS. 3 and 4) is fixedly secured to a valve shaft 37 which projects through a valve shaft bore 35 in operator support block 34. A spacer 36 is provided to maintain crank throw 31 in spaced relationship to operator support block 34, for reasons which will become apparent. Valve shaft 37 terminates in a key 37a. Key 37a is received in a correspondingly configured slot 53 on valve drive hub 52 shown in FIGS. 3 and 4. Valve drive hub 52 is bolted by means of bolts 54 (FIG. 12) to one end of valve 41, bolts 54 being threadably received by threaded bores 41a shown in FIGS. 10 and 12. Thus, the reciprocal movement of outer valve crank throw 31 is transmitted to valve 41 by shaft 37 and valve drive hub 52.

Figure 3:
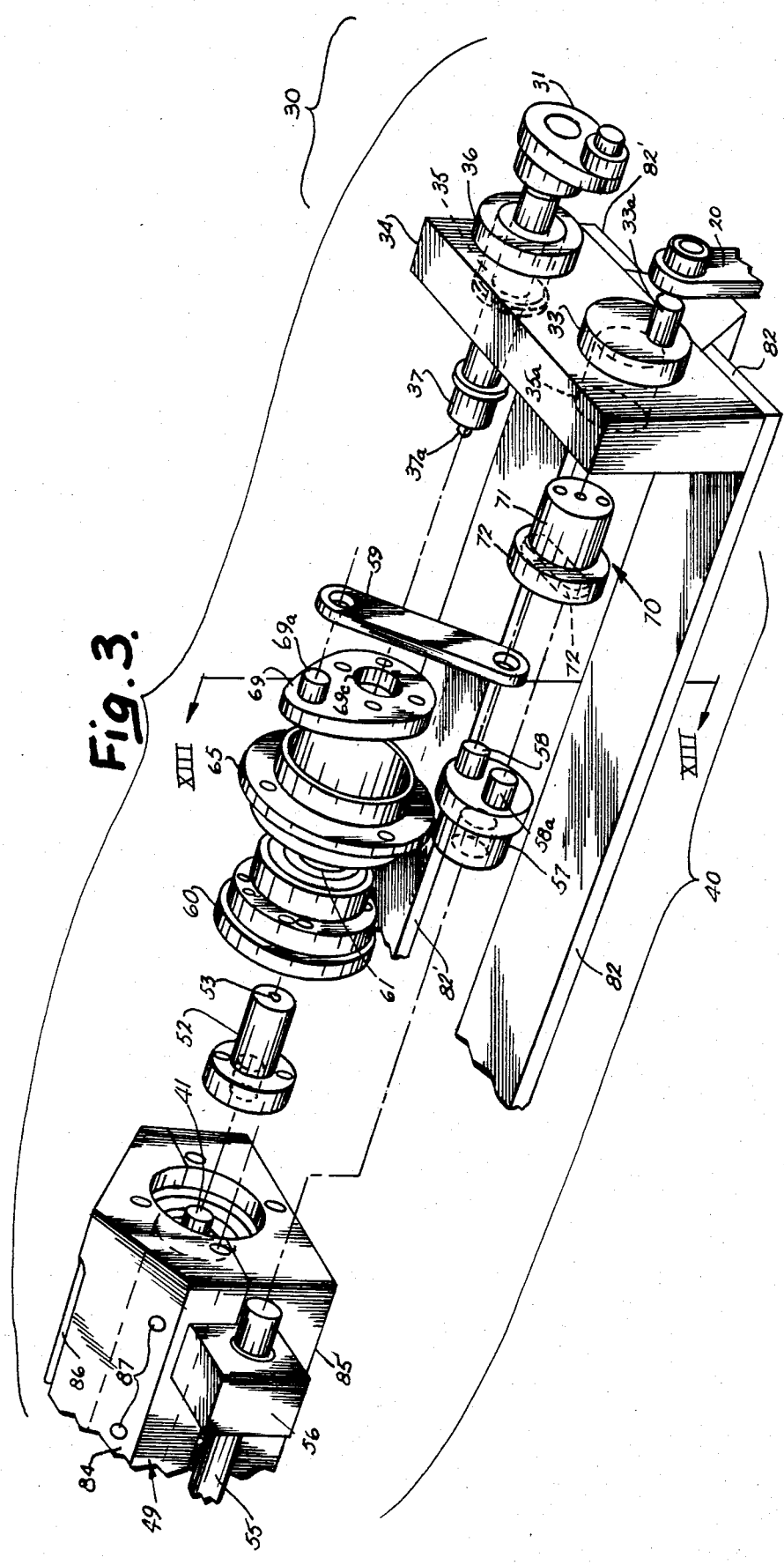
FIG. 3 is an enlarged, detailed, exploded, fragmentary perspective view of the positive-displacement operator assembly and the positive-displacement module assembly of the present invention.

Note that as shown in FIG. 3, the pivotal movement of the outer valve crank throw 31 about 90° causes the valve to pivot counterclockwise from the position shown in FIG. 13 to the position shown in FIG. 18. However, it is possible by adjusting the relative position of the outer valve crank throw 31 to valve 41 and charging the position of cam 16 on shaft 18 that the valve can be rotated clockwise from the position shown in FIG. 13 to the position shown in FIG. 18. When this is done, however, there have been slight problems with the deposit extruded from the left chamber being the same size as that extruded from the right chamber. This is believed to be due to longitudinal flexing of the valve when the valve is disposed with one or the other concave surface 42 facing upwardly against the pressurized media from feed rollers 12, 12'. Better results are achieved by pivoting valve 41 counterclockwise between the two aforesaid positions and clockwise between the position of FIG. 20 to the position of FIG. 13.

As shown in FIG. 6, cam 16 has two constant-radius portions connected by two narrowing diameter portions of equal length. The larger radius portion (i.e. the 90° arc between radii $d_1$—$d_1$) shown in FIG. 6 maintains valve crank arm in its uppermost position for about 90° of the rotation of cam 16 on shaft 18, when arc $d_1$—$d_1$ meets cam follower 17. The larger constant-radius portion of cam 16 will therefore maintain the arm in its uppermost position for a certain period of time dependent on the rotational speed of shaft 18. This uppermost position corresponds to the valve position shown in FIG. 19. The smaller constant-radius portion (i.e. the 90° arc between radii $d_2$—$d_2$) shown in FIG. 6 maintains the valve crank arm in its lowermost position for about 90° of the rotation of cam 16 on shaft 18, when arc $d_2$—$d_2$ meets cam follower 17. The lowermost position would correspond to the valve position shown in FIG. 14.

Figure 7:
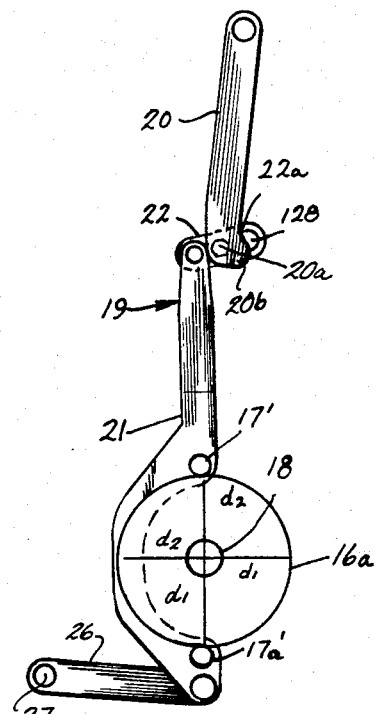
FIG. 7 is a front elevational view of the piston crank arm assembly utilized in the apparatus.
Figure 8:
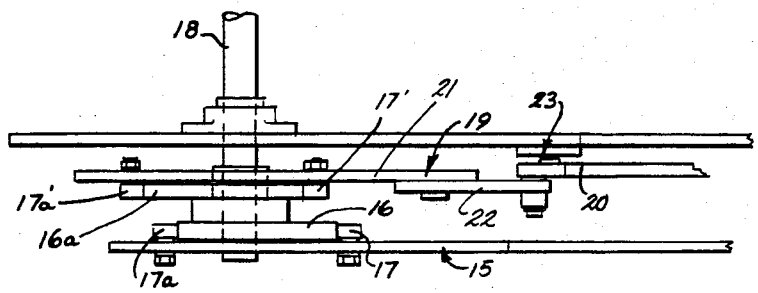
FIG. 8 is a fragmentary side elevation view of the cam-crank arm assembly used in the apparatus.
Figure 9:
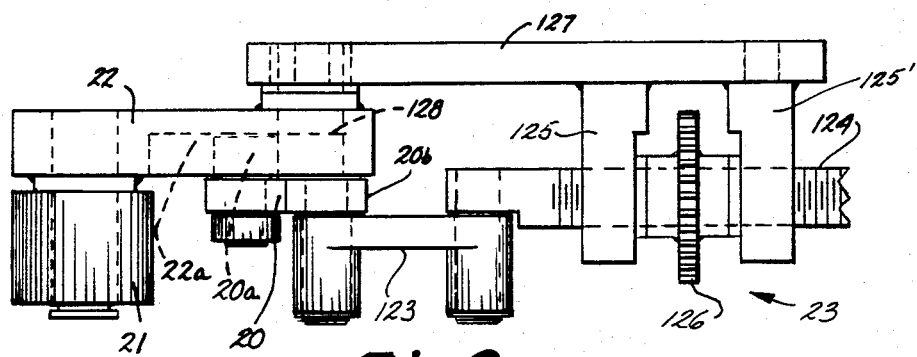
FIG. 9 is a fragmentary plan view of the stroke adjustment assembly for the piston crank arm.

As indicated above, the reciprocal motion of piston mechanism 45 is imparted thereto by piston crank arm 19 (FIGS. 1, 7 and 9). Piston crank arm 19 comprises an upper piston crank arm 20 and a lower piston crank arm 21, which are connected by a slotted linkage 22. Lower piston crank arm 21 is pivotally secured to one end of slotted linkage 22, and a spindle 20a (FIG. 9) projects inwardly from upper piston crank arm 20 into the slot 22a of slotted linkage 22. The position of spindle 20a and the bottom of upper piston crank arm 20 is made adjustable along slot 22a by means of a link 123 (FIGS. 1 and 9) which comprises part of a stroke adjustment mechanism 23. Link 123 is pivotally connected to a tab 20b (FIG. 7) on the lower end of upper piston crank arm 20. Link 123 is pivotally connected at the other end to a threaded adjustment rod 124. Threaded rod 124 is slidably received in bores extending through a pair of spaced bosses 125, between which is disposed a sprocket 126 having a threaded bore therein. Threaded adjustment rod 124 is threadably inserted through the threaded bore in sprocket 126. Thus, when sprocket 126 is rotated, as by a drive chain 126', threaded rod 124 will be moved longitudinally, either toward or away from piston crank arm 19 pulling tab 20b, thereby adjusting the position of spindle 20a in slotted linkage 22.

As best shown in FIG. 9, the entire stroke-adjustment mechanism 23 is mounted on a plate 127. Plate 127 is bolted to the front of the metering apparatus 10 (FIG. 1). The end of slotted linkage 22 distal from spindle 20a is pivotally secured to plate 127 by a spindle, or stud, 128, such that that end will pivot about the axis of the latter.

The lower piston crank arm 21 is pivotally connected at its lower end to one end of a piston pivot arm 26, which in turn is pivotally connected by a stud or pin 27 at its other end to the front of metering apparatus 10. Disposed at two points along lower piston crank arm 21 are two cam followers 17a, 17a'. Cam followers 17a, 17a' follow a piston crank arm cam 16a which is identical to valve crank arm cam 16 and which is similarly mounted to the shaft 18. The only difference between the two cams 16, 16a is that they are mounted on shaft 18 approximately 90° out of phase with one another as will be discussed below.

Piston crank arm cam 16a operates in combination with cam followers 17a and 17a' identically to the way valve crank arm cam 16 operates with cam followers 17, 17'. As piston crank arm cam 16a rotates with shaft 18, shown in FIG. 7, the larger diameter portion of the cam will force piston crank arm 19 upwardly as that portion of the cam traverses cam follower 17a. Conversely, as the larger-diameter portion of cam 16a meets cam follower 17a', piston crank arm 19 will be forced downwardly. Piston pivot arm 26 prevents significant lateral horizontal movement of lower piston crank arm 21, thus substantially restricting the movement of arm 21 to vertical upward and downward movement.

As lower piston crank arm 21 is forced upwardly, it forces slotted linkage 22 to pivot at pin 128, thereby forcing upper piston crank arm 21 upwardly by the inwardly-projecting spindle 20a in slot 22a. By adjusting the position of the inwardly-projecting spindle along slot 22a, by means of sprocket 126 (FIGS. 1 and 9), the degree of vertical displacement of upper piston crank arm 20 can be controlled, so that it will pivot at various distances (radii) from pin 128. The shorter the distance between the inwardly-projecting spindle and point 128, the shorter the upward stroke of upper piston crank arm 20 will be. The significance of this arrangement will become more apparent below.

Sprocket 126 is driven by a chain 126' with a second sprocket 130. Sprocket 130 is driven by a gear drive 131 (FIG. 1). Gear drive 131 is operated by a shaft 132 (FIGS. 1 and 2) which extends through the machine to a handle 133 which can be turned manually for adjusting the stroke length of the piston mechanism.

Figure 4:
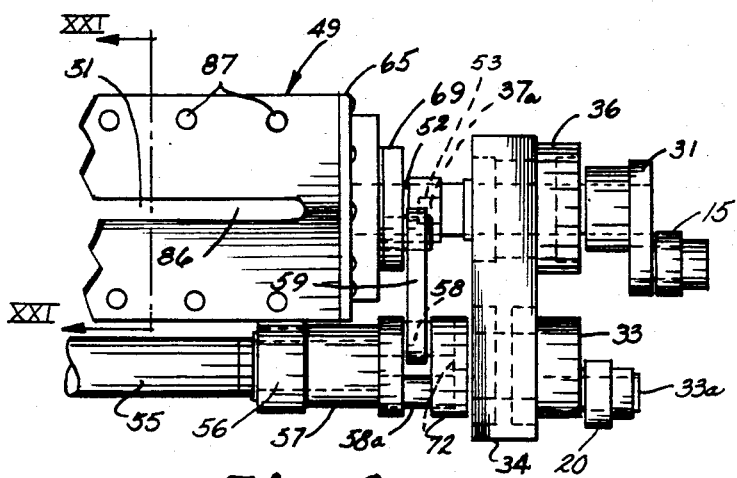
FIG. 4 is a top view of the positive-displacement operator assembly and the front of the module assembly.

The upward and downward reciprocating motion of upper crank arm 20 is transmitted to piston mechanism 45 by crank 33 (FIGS. 1, 3 and 4). Crank 33 has an eccentrically-mounted pin 33a projecting outwardly therefrom which is received in a journal at the upper end of upper piston crank arm 20. Thus, crank 33 will rotatably reciprocate as upper piston crank arm 20 reciprocates upwardly and downwardly. Crank 33 is fixedly secured to a central hub portion 71 (FIG. 3) of a drive coupling 70. Hub portion 71 extends through the crank operator bore 35a in operator support block 34.

Figure 12:
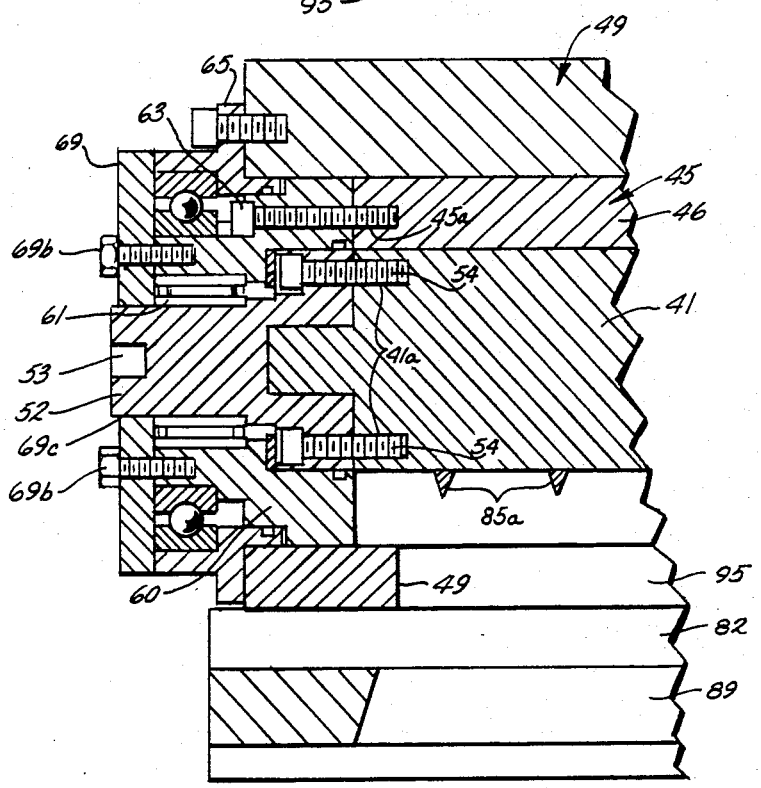
FIG. 12 is a cross-sectional view taken through the plane 12—12 of FIG. 3.

On the side of coupling 70 opposite from hub portion 71 is a drum portion 72 having an elongated slot 72a (FIGS. 3 and 4) in the side of the drum portion which faces away from support block 34. Elongated slot 72a receives two pins 58, 58a extending from drive shaft connector 57, which is secured to one end of piston drive shaft 55. Pin 58 is pivotally connected to one end of the piston drive link 59. The other end of link 59 is pivotally connected to a spindle 69a on piston crank throw 69 (FIGS. 3 and 4). Piston crank throw 69 is fixedly secured to a piston drive hub 60 by means of bolts 69b (FIG. 12). Piston drive hub 60 is in turn bolted to piston mechanism 45 by bolts 63 (FIG. 13) which are threadably received in holes 45a shown in FIG. 11. Thus, the rotational reciprocating movement of crank 33 will be transmitted through drive coupling 70 to drive shaft connector 57. The rotational reciprocating movement of drive shaft connector 57 will be transmitted through piston drive link 59 to piston crank throw 69 and piston drive hub 60. Thus, piston mechanism 45 will reciproate in an arcuate fashion in the upper arcuate portion 50 of cavity 48.

Bore 69c (FIGS. 3 and 12) is provided in piston crank throw 69 and bore 61 is provided in piston drive hub 60 so as to permit valve drive hub 52 to project therethrough to receive the key 37a of valve shaft 37.

Figure 2:
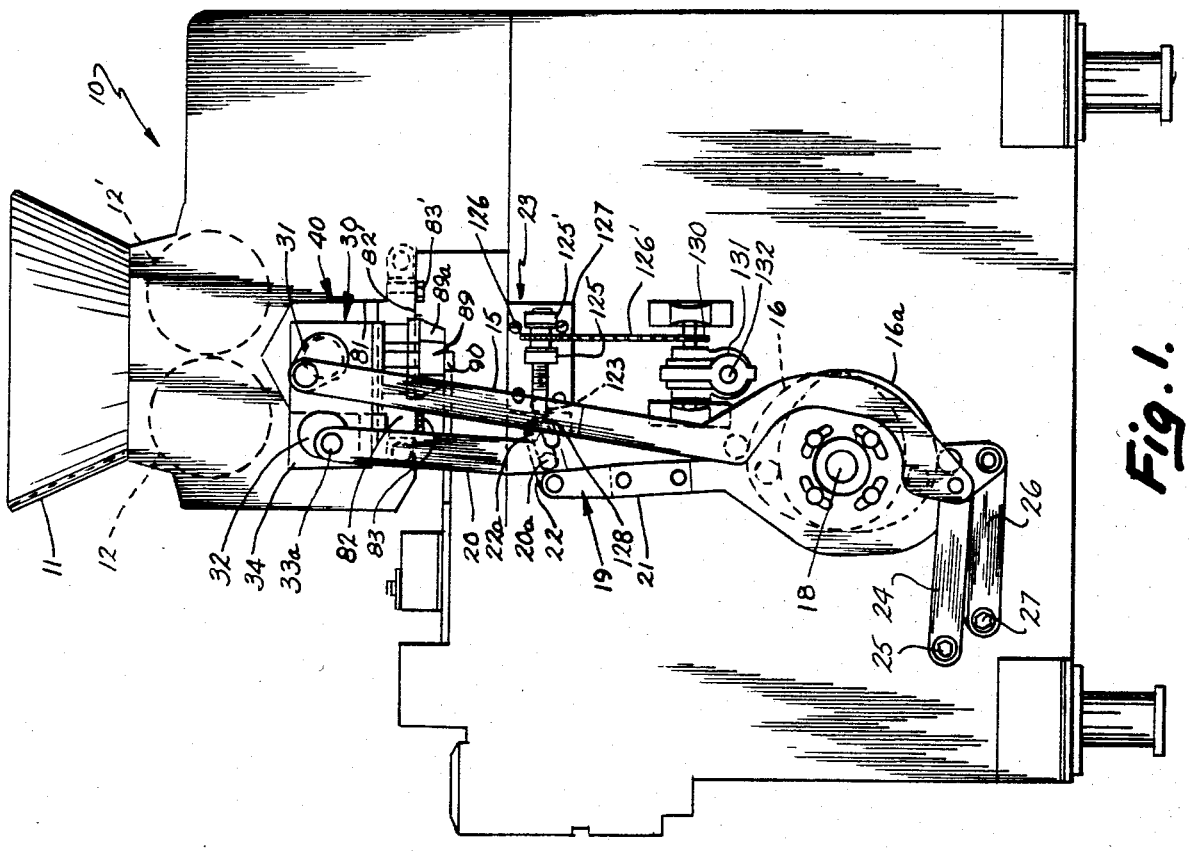
FIG. 2 is a rear elevation of the device shown in FIG. 1.

Because of the nature of the structure of the piston mechanism, with its two elongated pistons 46, 46' and its divider plates 47 welded across and between pistons 46, 46', it is preferable to drive the piston mechanism from both ends thereof so as to reduce torsion of the piston mechanism, which might result in fracture of the welds. Thus, as shown in FIGS. 2 and 5, a rear piston crank throw 74 is provided with a rear piston drive hub 75 connected therewith, the rear hub being bolted to the rear of the piston mechanism 45. A rear retaining mechanism 76 is provided to hold the above components in place in the rear of positive displacement modular assembly 40 shown in FIG. 5.

The rear piston crank throw 74 is reciprocally driven by piston drive shaft 55 previously described, which extends from drive shaft connector 57 to the rear of positive-displacement modular assembly 40 and is supported by bearing blocks 56 having bores therethrough for receiving said drive shaft, bearing blocks 56 being fixedly secured to modular assembly 40. The rear end of drive shaft 55 has a rear crank 77 with a spindle 78 eccentrically mounted thereon. Spindle 78 and a corresponding spindle 74a on rear crank throw 74 are connected by a rear piston drive link 79. Rear piston drive link 79 performs the same function as piston drive link 59 only it drives the piston mechanism 45 from the rear of the machine. Thus, the rotationally reciprocating movement of crank 33 will be transmitted through drive shaft connector 57 and drive shaft 55 to both the front and rear piston crank throws by means of the front and rear drive links. Thus, the piston mechanism 45 will reciprocate across an arcuate path in upper arcuate portion 50 of cavity 48.

Rear piston drive hub 75 and rear piston crank throw 74 are for all intents and purposes identical to the front piston drive hub 60 and front piston crank throw 69, including the provision of bores therethrough for receiving a rear valve hub. A rear valve hub 80 is bolted to the rear of valve 41 so as to support the rear of the valve and maintain the valve in the center of cavity 48. The rear valve hub 80 is virtually identical to valve drive hub 52 with the exception that no slot is provided for receiving a key upon a valve shaft, valve 41 only being driven from the front of the machine.

Thus, the vertical upward and downward reciprocating motion of piston crank arm 19 is transmitted through crank 33 to the piston drive shaft and front and rear drive links, thereby rotationally reciprocally driving front piston crank throw 69 and rear piston crank throw 74 simultaneously. The degree of such reciprocating movement will of course be determined by the location of spindle 20a in slot 22a on slotted linkage 22, as previously described. Because the degree of reciprocation of the piston mechanism can be adjusted, the size of the deposit 90 shown in FIG. 17, for instance, can be varied. For example, if piston 46' does not completely move to the right as shown in FIG. 17, less media will be displaced from chamber 44' out of orifice 89. Therefore a smaller deposit 90 will be cut by wire 101.

The movement of the valve 41 and piston mechanism 45 is, of course, governed by the rotation of shaft 18 and the relative positions of cams 16 and 16a thereon. As indicated above, cams 16, 16a are fixedly secured to shaft 18 so that they are approximately 90° "out of phase". By "out of phase", it is meant, for example, that as cam follower 17 is at the end of travelling across the large diameter portion of cam 17, as shown in FIG. 1, the end of the large-diameter portion of cam 16a will be approximately 90° ahead when the angle is measured from a line through cam follower 17 and the center of shaft 18 in the direction of rotation of shaft 18. Since the beginning of the large-diameter portion of cam 16a is about 90° behind the beginning of the large-diameter portion of cam 16a, the beginning of the large-diameter portion of cam 16a will be meeting cam follower 17a' as shown in FIG. 1. Therefore, as cam follower 17 nears the end of the large-diameter portion of cam 16, it will begin to follow along a progressively narrowing portion of cam 16, thereby causing valve crank arm 15 to move downardly. At this point, valve 41 will begin its shift from the position shown in FIG. 16 to the position shown in FIG. 18. This transition between these two positions will be effected by cam follower 17 moving progressively downwardly on progressively-narrowing portion $d_1$-$d_2$ on cam 16, until the constant small-diameter portion $d_2$-$d_2$ of cam 16 is reached. Cam follower 17 will follow on this constant small-diameter portion for approximately 90° while valve 41 is in the position shown in FIGS. 18 through 20.

At the point where cam follower 17 is at the end of the large constant-diameter portion $d_1$-$d_1$ of cam 16 and valve 41 is in the position shown in FIG. 16, cam follower 17a is at the beginning of the small constant-diameter portion $d_2$-$d_2$ of cam 16a, as shown in FIGS. 1 and 7. The piston mechanism, therefore, is at the position shown in FIG. 16. Cam follower 17a will follow along on the small constant-diameter portion $d_2$-$d_2$ of cam 16a for approximately 90° of the rotation of shaft 18 as valve 41 moves from the position shown in FIG. 16 to the position shown in FIG. 18. Thereafter, cam 17a will meet an increasingly larger-diameter portion $d_2$-$d_1$ of cam 16a, thereby forcing piston crank arm upwardly and causing piston mechanism 45 to shift from the position shown in FIG. 18 to the position shown in FIGS. 19 and 20. Piston mechanism 45 will be maintained in the position shown in FIGS. 19, 20 and 13 as cam follower 17a follows along the large constant-diameter portion $d_1$-$d_1$ of cam 16a.

As indicated above, the positive-displacement modular assembly 40 is designed to be readily removable as a unit from metering apparatus 10. As explained above, the only connection between positive-displacement operator assembly 30 and positive-displacement modular assembly 40 is the key 37a inserted into slot 53 on valve drive hub 52 and the pins 58, 58a on drive shaft connector 57 inserted into slot 72 on drive coupling 70. Therefore, positive-displacement operator assembly 30 and positive-displacement modular assembly 40 are operably connected only at two places wherein one part is slidably inserted into another. The significance of this will become apparent.

Positive-displacement modular assembly 40, as indicated above, comprises a head 49 shown in FIG. 4, piston mechanism 45, valve 41, piston drive shaft 55, the front and rear drive hubs (60 and 75), the front and rear piston drive links (59 and 79), and the front and rear valve hubs (52 and 80). These elements cooperate in the manner described previously. The positive-displacement modular assembly 40 is slidably inserted into a recess 81 (FIGS. 1 and 2) in the top of metering apparatus 10 below feed rolls 12, 12' through the rear of the machine. The positive-displacement modular assembly 40 is supported in module recess 81 by means of two supports 82, 82' (FIGS. 1, 2, 3 and 13) which extend the length of the machine underneath modular assembly 40. Modular supports 82, 82' are fixedly secured to the upper portion of metering apparatus 10 underneath modular assembly 40 by means of four bolts 83 shown in FIGS. 1 and 2. As bolts 83 are tightened upwardly toward modular supports 82, 82' modular supports 82, 82' clamp modular assembly 40 into recess 81. Thus, when one wishes to remove modular assembly 40 from recess 81, one needs only loosen bolts 83, thereby unclamping modular assembly 40 from modular recess 81, and modular assembly 40 can then be slid horizontally out the rear of the machine from modular recess 81 on supports 82, 82'. Supports 82, 82' need not be completely removed. As assembly 40 is slidably removed from recess 81 through the rear of the machine, key 37 will disengage from slot 53 on valve drive hub 52, and pins 58, 58a on drive shaft connector 57 will be slidably removed from slot 72 on drive coupling 70.

With modular assembly 40 removed from metering apparatus 10, hopper 11, feed rolls 12, 12' and wire-cut assembly 100 can be cleaned in a conventional manner. These parts are more easily cleaned than modular assembly 40. Therefore, these parts can be cleaned, and a second modular assembly (not shown) can be inserted into recess 81 in place of the first, which can then be thoroughly cleaned in a more leisurely manner without interfering with ongoing production.

Figure 21:
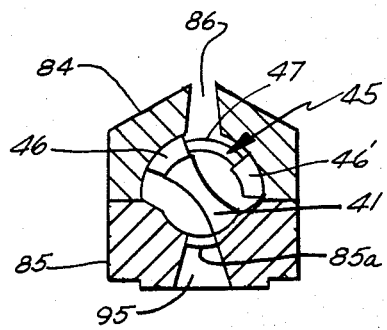
FIG. 21 is a cross-sectional view of the positive displacement module of the present invention taken along the plane XXI—XXI of FIG. 4.

The modular assembly 40 can easily be cleaned by the following procedure. As shown in FIGS. 5 and 21, head 49 consists of an upper half 84 and a lower half 85, which are bolted together by bolts 87. For cleaning, retaining rings 65, 76, bolts 87 and upper head half 84 should be removed exposing piston mechanism 45 and valve 41, which can then be at least partially cleaned without being removed from the lower head half 85. However, for thorough cleaning, these components should be completely removed and disassembled. Once the cleaning is completed, the modular assembly can be reassembled and stand ready for use.

Two other features of modular assembly 40 are important. First, an elongated feed slot 86 (FIGS. 3, 4, 5 and 21) is provided through the top head half 84 of modular assembly 40. This slot extends vertically downwardly to permit media to be fed into cavity 48 by feed rolls 12, 12'. Thus, slot 86 actually comprises part of throat 51 shown in the schematic views of FIGS. 13–20, it being understood that various details of the actual structure of modular assembly 40 are not specifically shown in those schematic drawings. Feed slot 86 is vertically aligned with, and mates with, the upper portion of throat 51 when modular assembly 40 is clamped into recess 81. Second, a further slot 95 (FIGS. 12 and 21) is also provided through the bottom head half 85, disposed in vertical alignment with slot 86 and communicating with chambers 44, 44', thereby permitting fluid communication to be established between orifice 89 and cavity 48. This allows media to be forced by piston mechanism 45 out of chambers 44, 44'. Third, a plurality of spaced crosspieces 85a (FIGS. 12, 21) are provided across slot 95 in the bottom head half. As indicated above, it has been found that the deposit extruded from one side is not the same size as that extruded from the other. This may be because the slot expands slightly wider under the pressure of the media being extruded from one or the other chamber by the piston assembly thereby leading to some deposit size variations. By providing the spaced crosspieces across slot 95, the slot is constrained from expanding wider, and it has been found the deposits are of a more uniform volume.

The "wire-cut" mechanism 100 is a known type of apparatus in the food-handling industry, particularly in the baking industry, and has long been used in conjunction with extruder and other such die cups through which dough or the like is forced. Such "wire-cut" assemblies typically utilize a cutting wire or knife which cycles back and forth beneath the extrusion orifice to cut off segments from the material being extruded, thereby forming wafers. Merely as examples of the general type of device which can be employed in combination with the machine discussed above, reference is made to prior U.S. Pat. No. 2,162,145 to F. C. Werner and U.S. Pat. No. 3,448,696 to A. F. VerHoeven, both assigned to the assignee hereof. Due to the general familiarity in the art with such "wire-cut" devices, no particular detailed explanation is deemed necessary herein, even though the presence of such a component as part of the overall apparatus disclosed herein is, at least in a functional or operational sense, of definite importance.

The important function of the wire-cut assembly 100 is to cut deposits 90 from orifice 89 synchronously with the sequential operation of the piston mechanism 45 and valve 41 after each successive deposit 90 is extruded from orifice 89.

Orifice 89 preferably comprises a series of separate, mutually-spaced and aligned extruder die cups (not shown), generally indicated by 89a, through all of which the media is extruded by a single elongated valve and piston mechanism as described above. Of course, extruder die cups, in and of themselves, are well known in the food industry, and the concept of feeding baking media to a number of individual spaced die cups from a common piston-actuated unit, acting as a supply plenum, is well known. Virtually any number of extruder die cups can thus be arranged beneath cavity 48 so as to receive accurately-metered quantities of media from the valve-piston device described above.

As noted hereinabove, the present invention further contemplates the employment of the positive-displacement volumetric depositor of the present invention in a manner by which each of the individual deposits making up the repetitive sequence of controlled volumetric discharges so obtained is in effect enclosed or encased ("embedded") within a stream of different media. Such a result is obtained by taking the volumetric discharge directly from one or more of the die cups or discharge orifices, as shown and described hereinabove for example, even without severing the repetitive discharge by utilizing a wirecut or other such severing mechanism, and injecting such output by appropriate coupling conduit directly into the interior of a second discharge stream, for example, from an extruder, generally in the manner utilized in the past for "co-extrusion" processes.

The result obtained in accordance with the approach first described is distinctly different and very useful in certain instances, since in effect the volumetric discharges obtained in accordance with the herein-described apparatus and process will, by use of appropriate choices of relative quantity and relative speed parameters, appear in the resulting stream as partially or fully hidden "nuggets" which are in effect embedded in and encapsulated by the second media. In turn, the second media may itself be run in either a continuous or discontinuous pulsing manner, in the first such case producing a continuous stream of the one media which encapsulates spaced deposits of the other media, and in the second such case producing a succession of separate, mutually-spaced deposits of the one media with other media enclosed within each such separate deposit. Of course, in the first such case, the continuous stream may be severed or separated into separate units at a desired point following injection of the embedded deposits.

The alternative approach described in the preceeding two paragraphs helps to illustrate a further aspect of the present invention, i.e., while the concepts and embodiments particularly shown and described may be considered to be a new and highly accurate form of "wire-cut machine", as that general type of apparatus has become designated in the past, the volumetric depositor portion may certainly be used to great advantage without a severing means beneath the discharge orifice. In such a mode, depending upon a variety of factors such as media consistency and thickness or viscosity, speed of operation, orifice size, etc., the discharged media may appear as a regular succession of substantially separate charges or deposits, each of highly accurate and consistent proportions (i.e., volume and weight). Such individual deposits would, typically, be dropped onto a receiving conveyor band or belt, disposed a selected distance beneath the discharge orifice, just as is true of the severed wafer-like deposits 90 described above. In such a setting, the speed of such conveyor directly affects the amount of relative spacing of the individual deposits upon the conveyor member.

The volumetric depositor of this invention runs very smoothly at high deposition rates. It does not vibrate violently because the pistons do not move very far in a stroke or as fast as the cylindrical head devices mentioned above. In addition, the movement of the piston mechanism in one direction is partially offset by the movement of media in the other direction. Also, the valve is balanced about the axis upon which it pivots so the valve does not contribute to much vibration.

Finally, few sanitation problems will occur with the depositor of the present invention due to accumulations of food media in the machine. Food media constantly moves across the concave surfaces of the valve preventing food from accumulating thereon. The valve convex surfaces scrape and are scraped by the pistons preventing food from accumulating on the scraped surfaces of the pistons and the valve. Ths pistons scrape the upper part of the cavity and food constantly moves across the lower surfaces of the cavity substantially preventing food from accumulating on the surfaces of the cavity. Therefore, no unusual sanitation problems should be encountered with the depositor of the present invention.

It is to be understood that the above is merely a description of a preferred embodiment of the invention and that various changes, alterations and variations may be made without departing from the underlying concepts and broader aspects of the invention as set forth in the appended claims, which are to be interpreted in accordance with the established principles of patent law, including the doctrine of equivalents.

The embodiments of the invention in which an exclusive property or privilege is claimed are defined as follows:

1. A volumetric metering apparatus for providing a continuous succession of accurately metered deposits of media, comprising:
   (a) a supply means for providing media;
   (b) a support having a cavity therein, said cavity being in fluid communication with said supply means and being in fluid communication with a discharge orifice defined by said support;
   (c) valve means disposed in said cavity and defining first and second chambers therein;
   (d) means for moving at least portions of said valve means between a first position wherein said first chamber is in fluid communication with said supply means whereupon said first chamber is charged with media and wherein said second chamber is in fluid communication with said discharge orifice, and a second position wherein said second chamber is in fluid communication with said supply means whereupon said second chamber is charged with media and wherein said first chamber is in fluid communication with said discharge orifice; and
   (e) positive-displacement metering plunger means disposed in said chambers and operatively associated with said valve means, for alternatingly discharging volumetric quantities of said media from said chambers when each of said chambers is in fluid communication with said discharge orifice.

2. The apparatus as recited in claim 1 wherein:
   (a) said cavity has an upper portion;
   (b) said support includes a head, said cavity being within said head, said valve and plunger means being disposed therein, said head having a slot through the top of said upper portion for maintaining said supply means in fluid communication with said cavity;
   (c) said portions of said valve means are pivotally movable in said cavity from said first position to said second position;
   (d) said plunger means comprises two pistons which are disposed within said upper portion above said valve, said pistons sealingly engaging said upper portion, and being disposed on either side of said slot, said pistons each being reciprocally movable such that said first piston sealingly engages valve means portions when the latter are in said second position whereupon said first piston is moved into said first chamber, and such that said second piston sealingly engages said valve means portions when the latter are in said first position;
   (e) means for reciprocally moving said pistons is provided such that said first piston is moved into said first chamber after said chamber is charged with media while said first chamber is in fluid communication with said discharge orifice, thereby discharging a volumetric quantity of media from said first chamber, and such that said second piston is moved into said second chamber while said second chamber is in fluid communication with said discharge orifice, thereby discharging a volumetric quantity of media from said second chamber, whereby volumetric quantities of media are alternatingly discharged from said chambers.

3. The apparatus as recited in claim 2 which further comprises means for adjusting the degree of reciprocal movement of such pistons, thereby adjusting the size of said volumetric quantities discharged by said apparatus.

4. The apparatus as recited in claim 3 which further comprises a cyclically operable cut-off means operatively disposed adjacent said discharge orifice, and means for cyclically operating said cut-off means, thereby serving increments of said media as said media is alternatingly discharged through said orifice by said pistons, thereby forming discrete deposits thereof.

5. The apparatus as recited in claim 2 wherein said head, valve means and pistons are a modular unit removable as one integral assembly from said apparatus.

6. The apparatus as recited in claim 5 wherein said reciprocal piston movement means is engageable with said piston means by members which have a slide-fit relationship, whereby said modular unit is removable by disengaging said slide-fit members.

7. The apparatus as recited in claim 6 wherein said pivotal valve movement means is engageable with said valve means by members which have a slide fit relationship, whereby said modular unit is removable by disengaging said slide-fit members.

8. The apparatus as recited in claim 7 wherein said modular unit is clamped into position in said apparatus by releasable clamping means.

9. The apparatus as recited in claim 5 wherein said head is split into at least two sections releasably secured to one another, so that when said modular unit is removed said head can be split exposing said valve means and pistons for easy cleaning thereof.

10. The apparatus as recited in claim 9 wherein a plurality of spaced crosspieces are provided across said discharge orifice to prevent said orifice from expanding under the pressure of said volumetric quantities discharged by said aperture.

11. The apparatus as recited in claim 8 wherein said head is split into at least two sections releasably secured to one another, so that when said modular unit is removed said head can be split exposing said valve means and pistons for easy cleaning thereof.

12. The apparatus as recited in claim 2 wherein said valve means has curved, concave surfaces on its sides to facilitate the flow of material from each chamber.

13. The apparatus as recited in claim 12 wherein said valve means has a curved, convex surface on its top so as to engage sealingly each of said pistons when each moves into its chamber.

14. The apparatus as recited in claim 13 wherein said cavity has an arcuately-shaped bottom portion extending between said chambers having an opening therethrough in communication with said orifice, and wherein said valve means has a curved, convex surface on its bottom to sealingly engage said curved bottom portion of one chamber as one of said pistons move into said other chamber.

15. The apparatus as recited in claim 2 which further includes connection means for spacedly positioning said pistons from each other and for fixedly securing them together.

16. The apparatus as recited in claim 15 wherein said connection means comprise at least one divider plate, said divider plate being disposed so as to permit said media to flow through said slot into said cavity.

17. The apparatus as recited in claim 16 wherein said cavity slot and orifice are elongated, and wherein said valve and pistons are elongated and longitudinally disposed in said cavity, whereby elongated volumetric quantities of media are alternatingly discharged from said chambers.

18. The apparatus as recited in claim 2 wherein said piston reciprocal movement means comprises piston crank means operably connected to said pistons, a piston crank arm eccentrically, pivotally secured to said piston crank means, and means to reciprocally move said piston crank arm toward and away from said piston crank means, whereby said reciprocal movement of said piston crank arm creates reciprocal movement of said piston.

19. The apparatus as recited in claim 18 wherein said piston crank arm reciprocal movement means comprises motor means, a piston cam eccentrically mounted on said motor means, at least one piston cam follower mounted on said piston crank arm and positioned to contact said piston cam, whereby rotation of said eccentric piston cam causes said piston cam follower to move said piston crank arm.

20. The apparatus as recited in claim 19 wherein said piston cam has two constant diameter portions, one diameter being larger than the other, said larger constant diameter portion being separated from said smaller diameter portion by two narrowing diameter portions of equal length, said two constant diameter portions havng a common center point on said cam, about which point said cam is rotatable by said motor means, whereby when said piston cam follower contacts said piston cam, said piston crank arm will move toward and away from said piston crank means by following on said piston cam.

21. The apparatus as recited in claim 20 wherein two spaced piston cam followers are provided on said piston crank arm, said piston cam being disposed between said two piston cam followers such that said piston cam forces said piston crank arm toward and away from said piston crank means by said piston cam followers following on said piston cam.

22. The apparatus as recited in claim 21 wherein said piston crank arm includes at least two segments, with one segment being connected to said piston crank means and stroke adjustment means between said piston crank means and said cam followers connecting said two segments, said stroke adjustment means for adjusting the degree to which said one segment moves toward and away from said piston crank means, whereby the stroke of said pistons in said cavity can be adjusted.

23. The apparatus as recited in claim 22 wherein said stroke adjustment means comprises a slotted linkage one end of which is pivotally secured against longitudinal movement, the other end of which is pivotally connected to the other of said piston crank arm segments, an elongagted slot intermediate the ends of said linkage, the end of said one piston crank arm distal from said piston crank means being secured to said linkage and slidable in said slot, and means for adjusting the position of said distal end of said one piston crank arm segment in said slot, whereby the movement of said other end of said slotted linkage by said other piston crank arm segment forces said slotted member to move said one segment a certain distance dependent on the position of said distal end in said slot, whereby the degree of reciprocal movement of said pistons can be adjusted.

24. The apparatus as recited in claim 21 wherein each of said constant diameter portions on said piston cam subtends an angle of about 90°.

25. The apparatus as recited in claim 2 wherein said valve pivotal movement means comprises:
    (a) hub means connected with said valve means;
    (b) a valve crank arm eccentrically, pivotally secured to said hub; and
    (c) means for reciprocally moving said valve crank arm toward and away from said hub means, whereby said reciprocal movement of said valve crank arm creates pivotal movement of said valve means.

26. The apparatus as recited in claim 25 wherein said valve crank arm reciprocal movement means comprises motor means, a valve cam eccentrically mounted on said motor means, at least one valve cam follower mounted on said valve crank arm and positioned to contact said valve cam, whereby rotation of said eccentric valve cam causes said valve cam follower to move said valve crank arm.

27. The apparatus as recited in claim 26 wherein said valve cam has two constant diameter portions, one diameter being larger than the other, said larger constant diameter portion being separated from said smaller diameter portion by two narrowing diameter portions of equal length, said two constant diameter portions having a common center point on said cam, about which point said cam is rotatable by said motor means, whereby when said valve cam follower contacts said valve cam, said valve crank arm will move toward and away from said hub means by following on said valve cam.

28. The apparatus as recited in claim 27 wherein two spaced valve cam followers are provided on said valve crank arm, said valve cam being disposed between said two valve cam followers such that said valve cam forces said valve crank arm toward and away from said hub by said valve cam followers following on said valve cam.

29. The apparatus as recited in claim 27 wherein each of said constant diameter portions subtend an angle of about 90°.

30. A positive-displacement module assembly for cooperative association with a metering apparatus for accurately metering deposits of media, comprising:
    (a) a head with a cavity therein, a media inlet and a discharge outlet, said inlet and outlet in fluid communication with said cavity;
    (b) valve means disposed in said cavity defining first and second chambers therein, said valve means being movable between a first position where said first chamber is in fluid communication with said outlet and a second position where said second chamber is in communication with said outlet;
    (c) piston means disposed in said cavity movable such that when said first cavity communicates with said outlet, media can be discharged from said first cavity out of said outlet and such that when said second cavity communicates with said outlet, media can be discharged from said second cavity.

31. The positive-displacement module assembly as recited in claim 30 wherein said valve means are pivotally movable in said cavity between said two positions.

32. The positive-displacement module assembly as recited in claim 31 wherein said piston means comprises two pistons disposed between said valve and one side of said cavity, said media inlet being provided through said one side between said pistons, said pistons each being movable such that said first piston sealingly engages said valve means when said valve means are in said first position whereupon said first piston can be moved into said first chamber forcing media therefrom through said outlet, and such that said second piston sealingly engages said valve means when said valve means are in said second position whereupon said second piston can be moved into said second chamber forcing media therefrom through said outlet.

33. The positive-displacement module assembly as recited in claim 32 wherein said valve has at least one convex surface for sealingly engaging one of said pistons, said pistons each having a correspondingly curved surface to engage said valve.

34. The positive-displacement module assembly as recited in claim 33 wherein said valve has at least one concave surface to facilitate the flow of media out of one or the other of said chambers.

35. The positive-displacement module assembly as recited in claim 32 wherein said two pistons are connected fixedly to one another by a plurality of spaced divider plates whereby said pistons can move in tandem.

36. The positive-displacement module assembly as recited in claim 35 wherein at least one crosspiece is provided across said discharge outlet permitting media to flow therethrough but to restrict the expansion of said outlet under the pressure of said media as it is being discharged.

37. The positive-displacement module assembly as recited in claim 35 wherein said one side of said cavity is arcuately shaped and said pistons are arcuately disposed against said one side.

38. The positive-displacement module assembly as recited in claim 30 wherein means on said module assembly for releasably connecting said module assembly with the operative components of said metering apparatus are provided.

* * * * *